United States Patent [19]
Sutcliffe et al.

[11] 3,948,610
[45] Apr. 6, 1976

[54] CATALYST BEDS FOR OXIDIZING AMMONIA TO NITROGEN OXIDES

[75] Inventors: David Malcolm Sutcliffe; Richard John Young; Wilhelm Wyrwas, all of Norton, England

[73] Assignee: Imperial Chemical Industries Limited, London, England

[22] Filed: June 4, 1973

[21] Appl. No.: 366,977

[30] Foreign Application Priority Data
June 5, 1972 United Kingdom.............. 26131/72

[52] U.S. Cl............... 23/288 K; 23/288 R; 423/404
[51] Int. Cl.².................... B01J 8/02; C01B 21/26
[58] Field of Search........... 23/288 R, 288 H, 288 J, 23/288 K, 288 F, 289; 423/403, 404

[56] References Cited
UNITED STATES PATENTS

| | | |
|---|---|---|
| 3,475,133 | 10/1969 | Muller-Wartenberg.......... 23/288 R |
| 3,649,213 | 3/1972 | DePalma.......................... 23/288 F |
| 3,702,238 | 11/1972 | Armistead et al................ 23/288 R |
| 3,712,856 | 1/1973 | Betz............................... 252/463 X |
| 3,715,193 | 2/1973 | Strelzoff........................... 23/288 R |
| 3,736,105 | 5/1973 | Tourtellotte et al. ............. 23/288 F |
| 3,817,716 | 6/1974 | Betz............................. 23/288 R X |

Primary Examiner—Joseph Scovronek
Attorney, Agent, or Firm—Cushman, Darby & Cushman

[57] ABSTRACT

A catalyst bed for a reactor for oxidising ammonia in the presence of a particulate catalyst which either comprises a first layer occupying part of the cross-section of the reactor and a second layer downstream of the first layer and shaped to occupy more than the part of the cross-section not occupied by the first layer, or is disposed between two perforate septa each in the form of a wall of a solid figure parallel to, or tapering outwards or inwards in, the direction of gas flow.

9 Claims, 4 Drawing Figures

CATALYST BEDS FOR OXIDIZING AMMONIA TO NITROGEN OXIDES

This invention relates to catalyst beds for use in oxidising ammonia to nitrogen oxides, especially using catalysts other than platinum group metal catalysts in continuous-thread form.

It has been a long-standing objective of research to find an alternative to the platinum group metal catalysts, which have up to now been about the only satisfactory catalysts for the oxidation of ammonia. Recently some success has been obtained using particulate oxide catalysts, such as pelleted sintered cobalt oxide, but it has been found that these behave in some ways differently from platinum group metal catalysts, as a result of which direct replacement of the platinum metal gauze catalyst by a bed of particulate catalyst has not given a fully satisfactory process.

In order to obtain optimal throughput of reactants, it appears to be desirable to present a greater area of catalyst bed to the reacting gases. We have devised catalyst bed arrangements by which such a greater area can be provided without the need to design reactors wider than would be used for such platinum group metal catalysts. Preferred catalyst beds according to the invention can be inserted into existing reactors in replacement of the bed of platinum group metal catalyst in all-metal form (such as gauze) normally used.

According to the invention a catalyst bed for a reactor for oxidising ammonia comprises a first layer shaped to occupy part of the cross-section of the reactor, a second layer shaped to occupy more than the part of the cross-section not occupied by the first layer, a framework effective to hold the second layer downstream of the first layer and a septum effective to guide on to the second layer the gas by-passing the first layer.

Most suitably the catalyst bed encloses a particulate catalyst for example a particulate oxide catalyst such as pelleted sintered cobalt oxide.

The catalyst bed framework preferably includes means to support the bed within a reactor, including for example a flange capable of occupying or resting on an extension of the joint between the upper and lower portions of an ammonia oxidation reactor as normally constructed, or means to co-operate with the framework of a pre-existing platinum group metal catalyst bed. The invention provides also a reactor containing a catalyst bed as defined above.

The catalyst bed most conveniently has 2 layers, but 3 or more layers could be used if desired.

The layers can each carry a single body of catalyst particles, but each layer can, if desired, be divided. Thus for example, a circular catalyst bed may have 2 layers each in the shape of a segment greater than a semicircle; or may have 2 layers each in the form of 2 sectors each greater than a quadrant. Most conveniently the upstream layer is a flat annulus and the downstream layer is a circle of area greater than the hole in the annulus. This arrangement is simple and mechanically strong and is easier to provide with catalyst-ignition, as described below. The catalyst is more readily accessible, for charging, spreading and discharging.

Especially when the catalyst bed is to be used for a catalyst other than an all-metal platinum group metal catalyst, special ignition arrangements are needed since the thermal conductivity of the body of catalyst particles is low. A suitable ignition means provides a hydrogen flame in the space above the catalyst, as described in our co-pending UK application Ser. No. 26130/72. When the catalyst layers are co-axial a separate hydrogen-burner can be provided for each layer, fed from an axial supply pipe.

The invention provides also a process which comprises reacting ammonia with air over a catalyst in a plurality of layers within the same reactor, the layers being disposed transversely to the direction of flow of the reacting gas and having an aggregate area greater than that of the cross-sectional area of the reactor. When the catalyst is not a platinum group metal in allmetal form, the aggregate catalyst area is preferably 1.5 to 2.0 as great as would be used for such a catalyst.

According to a second aspect of the invention a catalyst bed for a reactor for oxidising ammonia is disposed between two perforate septa each in the form of a wall of a solid figure parallel to, or tapering outwards or inwards in, the direction in which gas is to flow through the reactor in which the bed is to be disposed.

The effect of such a bed is to increase the area presented to the flowing gas by disposing its surface non-perpendicularly to the direction of gas flow. The parallel shape may be realised by having the septa in the form of (for example) a rectangular prism or cylinder and the tapering shape by having the septa in the form of (for example) a hemisphere, cone, frustum of cone, pyramid, frustum of pyramid or pitched roof; these shapes can be and preferably are symmetrical about the axis or the axial plane of the reactor.

The catalyst bed can taper inwards towards the reaction gas inlet or towards the reaction gas outlet. Preferably it tapers inwards in an upward direction, so that the upper end can be surmounted by a reservoir for particulate catalyst.

If desired the layer arrangement can be used for a tapering bed, but this is not usually necessary, and gives rise to ignition difficulties owing to lack of access to the lower layer or layers. For a single-layer tapered bed it is preferred to have a hydrogen flame source covering the region parallel with and close to the catalyst bed, suitably of the kind described in our co-pending UK application Ser. No. 26130/72.

Analogously with the first aspect of the invention, this second aspect provides the catalyst bed in combination with means to support it within a reactor and also provides a reactor containing such a catalyst bed. It also provides an analogous process of ammonia oxidation.

The catalyst to be used in catalyst beds according to the invention is very suitably a particulate cobalt oxide catalyst as described in our co-pending UK application Ser. No. 46775/70, published in corresponding French application Ser. No. 2,109,930.

Preferred forms of the invention are shown in the accompanying drawings, of which:

Figure 1:
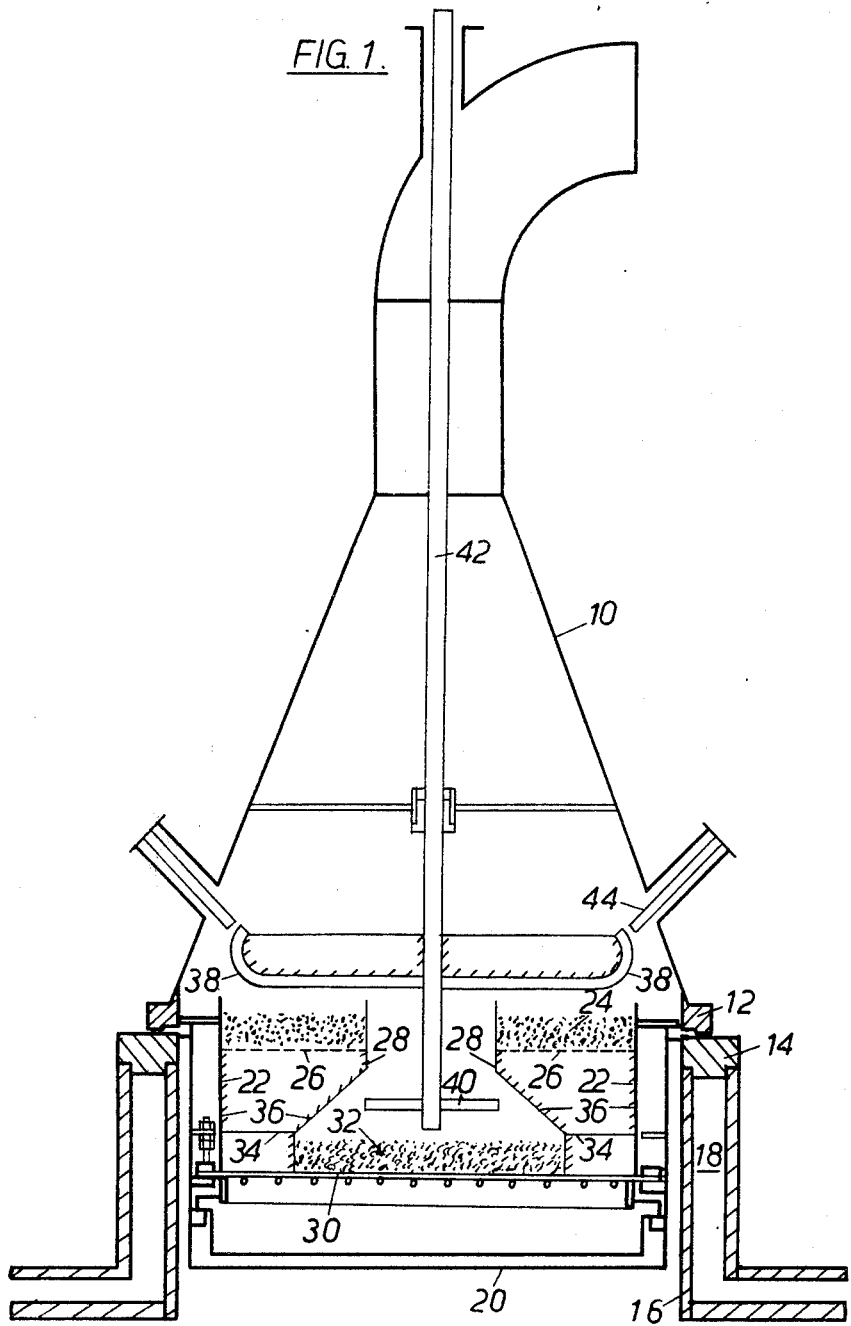
FIG. 1 shows in sectional elevation a reactor containing a two-layer catalyst bed.
Figure 2:
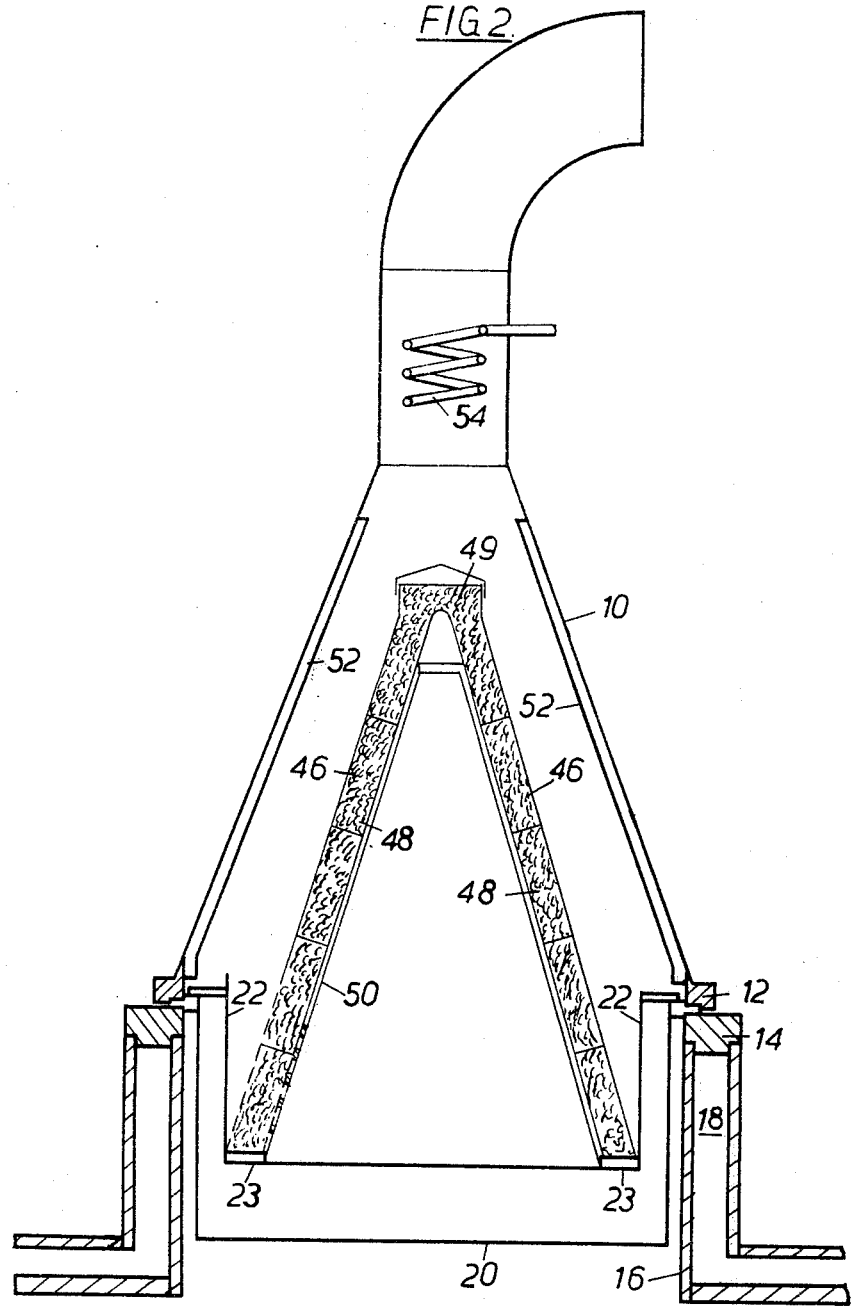
FIG. 2 shows in sectional elevation a reactor containing a catalyst bed tapering outwardly in the direction of gas flow.
Figure 3:
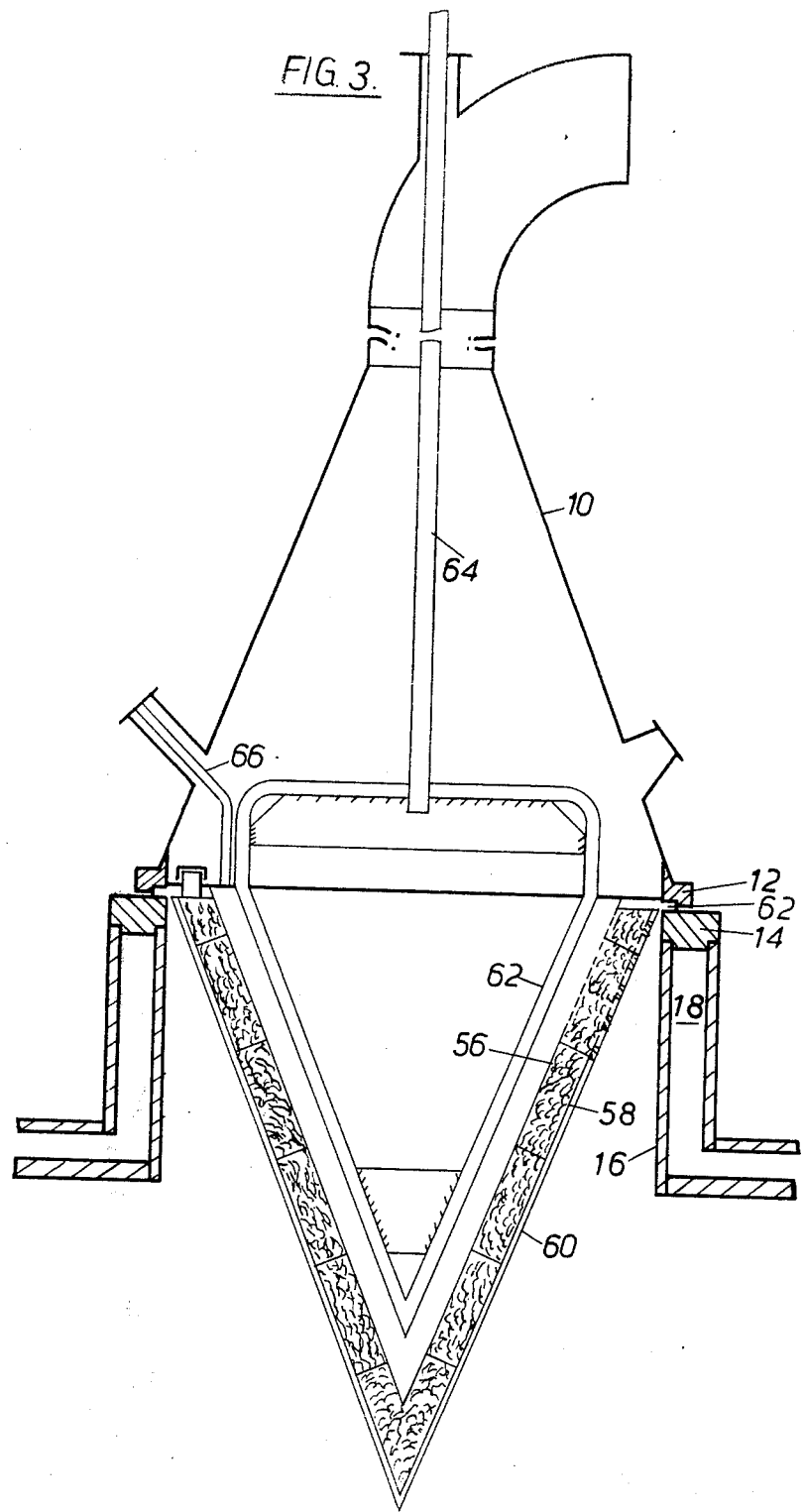
FIG. 3 shows in sectional elevation a reactor containing a catalyst bed tapering inwardly in the direction of gas flow.
Figure 4:
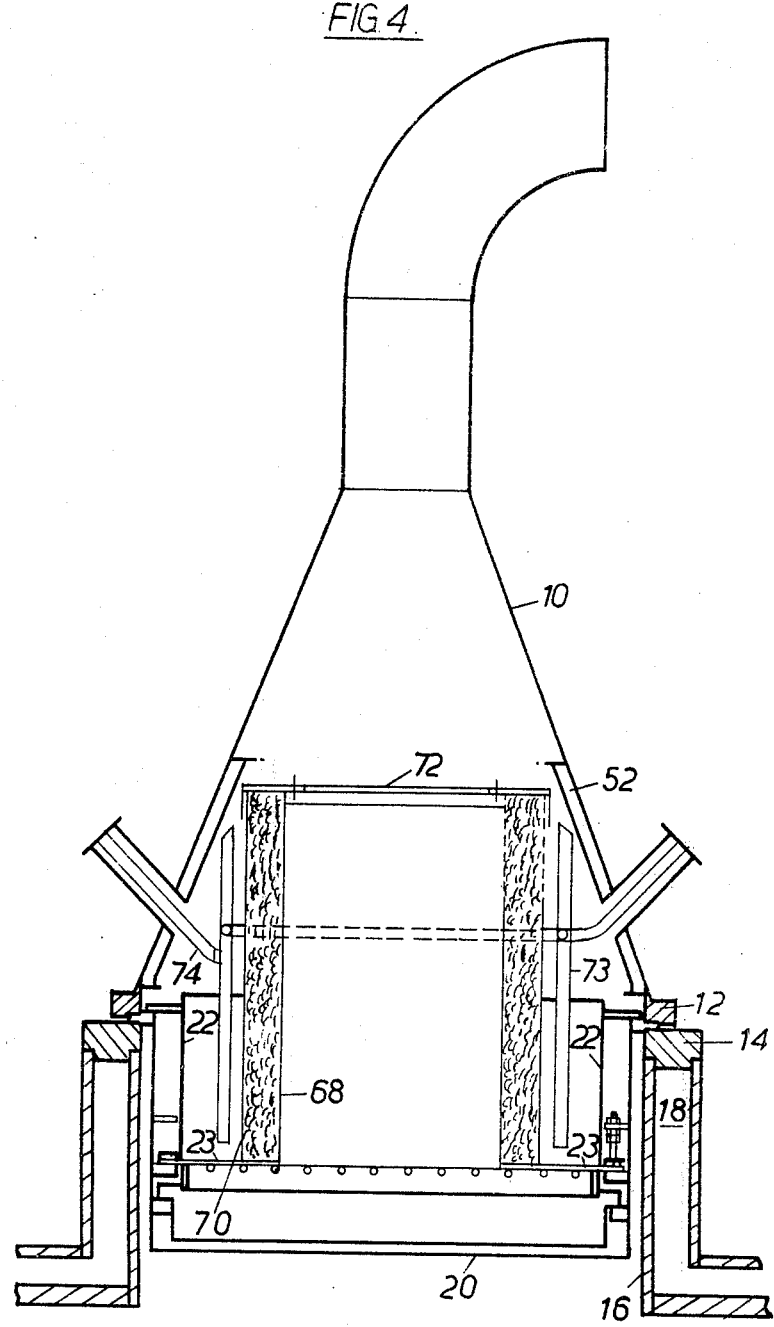
FIG. 4 shows in sectional elevation a reactor containing a catalyst bed enclosed by 2 cylindrical septa.

In all figures 1–4 item 10 is the upper portion of an ammonia oxidation reactor and terminates at its lower end in flange 12, which forms a joint with the mouth 14 of the lower portion of the reactor. The lower portion comprises inner wall 16, which is safeguarded from overheating due to the high temperature reaction gases by water-filled cooling jacket 18. The vessel lower portion normally contains a waste-heat boiler, through which reacted gases pass to absorbers for the nitrogen oxides. In FIGS. 1, 2 and 4 item 20 is the basket previously used in the reactor for platinum gauze catalyst and now used for supporting a bed of cobalt oxide catalyst. A basket of this type would not normally be needed in a reactor designed ab initio for cobalt oxide catalyst. In all these 4 reactors the flow of reactant gas is to be from top to bottom. The septa bounding the catalyst bed are all perforate but, for the sake of simplicity, only short perforated areas have been shown.

Referring now particularly to FIG. 1, the catalyst bed is enclosed by squat tube 22 constituting a support framework. At the upper end of tube 22 upper catalyst layer 24 is annular in shape and supported on mesh 26 between the tube and inner septum 28, which opens beneath and is joined to lower mesh 30 to provide the place for lower catalyst layer 32. Webs at 34 assist in keeping septum 28 correctly aligned with respect to tube 22 and support bed 24. In the region beneath layer 24, septum 28 is lined with refractory insulation 36 to protect it from hot reacted gases leaving layer 24. Above the catalyst bed item 38 is a gas sparger for heating layer 24 and item 40 for heating layer 32. The spargers, each a single diametral tube, are fed with hydrogen through hollow shaft 42; at start-up, while the ammonia/air mixture is fed downwardly over the catalyst, hydrogen is fed in through the spargers and ignited by spark-plugs 44 and the spargers are rotated to effect even heating of the catalyst.

The area of catalyst presented to the flowing gas is about 1.6 times the maximum that could be provided in a single flat layer in the same reactor.

Referring now particularly to FIG. 2, squat tube 22 is formed with a lower flange 23 on which rests the wide end of a catalyst bed enclosed by the two conical metal mesh septa 46 and 48. The upper end of the catalyst bed, at 49, provides a reservoir to keep the bed full, should shrinkage occur. The mesh enclosure rests on structural cone 50, also perforate, made of relatively heavy-gauge heat-resistant metal. Since the catalyst bed is close to the walls of reactor upper portion 10, the reactor walls are insulated with refractory layer 52. In this reactor the catalyst is heated at start-up by coil-shaped hydrogen burner 54; as an alternative a burner analogous to that of FIG. 3 could be used.

The area of catalyst presented to the flowing gas is just over twice the maximum that could be provided in a single flat layer in the same reactor.

Referring now particularly to FIG. 3, the basket 20 originally required for a platinum gauze catalyst has been abandoned and the catalyst bed is in the space between the two downwardly tapering conical mesh septa 56 and 58, which rest on structural cone 60, also perforate, made of relatively heavy gauge metal, which is suspended from ring 62. In this reactor the catalyst is heated at start-up by hydrogen flames provided by means of sparger 62 which, analogously to the spargers 38 and 40 of FIG. 1, are fed through hollow shaft 64, ignited by spark-plug 66, and rotated to effect even heating of the catalyst.

The catalyst bed area is similar to that of FIG. 2.

Referring now particularly to FIG. 4, squat tube 22 is formed with lower flange 23 on which rests the catalyst bed enclosed by cylindrical mesh septa 68 and 70. Septa 68 and 70 are reinforced by vertical rods (not shown), but structural cylinders of relatively heavy gauge perforate metal could be used if desired. The upper end of the catalyst bed is closed by lid 72. Since the catalyst bed is relatively close to the walls of reactor upper portion 10, the reactor walls are insulated with refractory concrete layer 52. In this reactor the catalyst is heated at start-up by hydrogen flames from spargers 73 (the number used depends on the reactor, diameter, but only 2 are shown, for the sake of clarity), ignited by spark-plug 74.

The area of catalyst presented to the flowing gas is at least twice the maximum that could be provided in a single flat layer in the same reactor. In this reactor the gas could alternatively flow outwardly through the catalyst bed. This could simplify ignition arrangements, but would direct hot reacted gases undesirably into contact with the reactor outer walls. As an alternative an overhead igniter like that of FIG. 2 could be used.

What is claimed is:

1. A reactor for oxidizing ammonia predominantly to nitrogen oxides, the said reactor having at least two catalyst beds charged with particulate cobalt oxide catalyst and having inlet means for reactant gas and outlet means for reacted gas, the catalyst bed nearest the inlet means occupying part of the cross-section of the reactor and permitting gas to bypass it and the subsequent catalyst bed occupying a part of the cross-section of the reactor greater than that not occupied by the first mentioned catalyst bed, wherein a septum is present to guide on to the second bed the gas that has bypassed the first bed and to guide away from the subsequent bed the gas that has passed through the first bed, said reactor having a cooling jacket to safeguard from overheating due to high temperature reaction gases, and the flow of reactant gas being from top to bottom in said reactor.

2. A reactor according to claim 1 wherein the first catalyst bed is a flat annulus and the second bed is a circle of area greater than the hole in the annulus.

3. A reactor for oxidizing ammonia predominantly to nitrogen oxides having inlet means for reactant gas and outlet means for reacted gas, the said reactor having a catalyst bed charged with particulate cobalt oxide catalyst and disposed between two perforate septa, each in the form of a wall of a figure parallel to the direction in which gas is to flow through the reactor in which the bed is disposed, the catalyst bed having a lid such that the direction of gas flow is through said septa, said septa having an aggregate surface area greater than that of the cross-sectional area of said reactor, said reactor having a cooling jacket to safeguard from overheating due to high temperature reaction gases, and a means to provide a hydrogen flame in the space upstream of the catalyst bed, the flow of reactant gas being from top to bottom in said reactor.

4. A reactor according to claim 3 in which the catalyst bed is disposed between two perforate septa each in the form of a rectangular prism or cylinder.

5. A reactor for oxidizing ammonia predominantly to nitrogen oxides having inlet means for reactant gas and outlet means for reacted gas, the said reactor having a catalyst bed charged with particulate cobalt oxide catalyst and disposed between two perforate septa, each in the form of a wall of a figure tapering outwards towards the reacted gas outlet, the catalyst bed being closed to gas flow other than through said septa, said septa having an aggregate surface area greater than that of the cross-sectional area of said reactor, said reactor having a cooling jacket to safeguard from overheating due to high temperature reaction gases, and a means to provide a hydrogen flame in the space upstream of the catalyst bed, the flow of reactant gas being from top to bottom in said reactor.

6. A reactor according to claim 5 in which the catalyst bed is disposed between two perforate septa each in the form of a cone or frustum of a cone.

7. A reactor according to claim 5 wherein the gas flow direction is downward and the upper end of the catalyst bed is surmounted by a reservoir for catalyst.

8. A reactor for oxidizing ammonia predominantly to nitrogen oxides having inlet means for reactant gas and outlet means for reacted gas, the said reactor having a catalyst bed charged with particulate cobalt oxide catalyst and disposed between two perforate septa each in the form of a wall of a figure tapering inward toward the reactor outlet, the catalyst bed being closed to gas flow other than through said septa, said having an aggregate surface area greater than that of the cross-sectional area of said reactor, said reactor having a cooling jacket to safeguard from overheating due to high temperature reactant gases, and a means to provide a hydrogen flame in the space upstream of the catalyst bed, the flow of reactant gas being from top to bottom in said reactor.

9. A reactor according to claim 8 in which the catalyst bed is disposed between two perforate septa each in the form of a cone or frustum of a cone.

* * * * *